(12) United States Patent
Nagasawa

(10) Patent No.: US 9,232,085 B2
(45) Date of Patent: Jan. 5, 2016

(54) PORTABLE TERMINAL APPARATUS, METHOD OF OBTAINING SCANNED DATA FROM AN IMAGE PROCESSING APPARATUS, AND RECORDING MEDIUM

(71) Applicant: KONICA MINOLTA, INC., Chiyoda-ku (JP)

(72) Inventor: Kenichi Nagasawa, Takatsuki (JP)

(73) Assignee: Konica Minolta, Inc., Chiyoda-ku, Tokyo (JP)

(*) Notice: Subject to any disclaimer, the term of this patent is extended or adjusted under 35 U.S.C. 154(b) by 0 days.

(21) Appl. No.: 14/460,424

(22) Filed: Aug. 15, 2014

(65) Prior Publication Data

US 2015/0062628 A1    Mar. 5, 2015

(30) Foreign Application Priority Data

Aug. 28, 2013   (JP) .................................. 2013-177414

(51) Int. Cl.
*H04N 1/00*   (2006.01)
*H04N 1/04*   (2006.01)

(52) U.S. Cl.
CPC ........... *H04N 1/001* (2013.01); *H04N 1/00106* (2013.01); *H04N 1/00225* (2013.01); *H04N 1/00228* (2013.01); *H04N 1/0405* (2013.01);
(Continued)

(58) Field of Classification Search
CPC . H04N 1/001; H04N 1/00106; H04N 1/0405; H04N 1/0417
USPC ........................................ 358/1.15, 527, 505
See application file for complete search history.

(56) References Cited

U.S. PATENT DOCUMENTS 7,173,730 B1 *  2/2007  Suzuki et al. ................. 358/1.16
7,930,407 B2 *  4/2011  Ragnet et al. ................. 709/227
8,976,379 B2 *  3/2015  Lee .............................. 358/1.13
(Continued)

FOREIGN PATENT DOCUMENTS

JP   2001-326782 A    11/2001
JP   2002-244630 A    8/2002
(Continued)

OTHER PUBLICATIONS

Office Action (Notification of Reasons for Refusal) issued on Aug. 4, 2015, by the Japanese Patent Office in corresponding Japanese Patent Application No. 2013-177414, and an English Translation of the Office Action. (6 pages).

*Primary Examiner* — Benny Q Tieu
*Assistant Examiner* — Quyen V Ngo
(74) *Attorney, Agent, or Firm* — Buchanan Ingersoll & Rooney PC

(57) ABSTRACT

A portable terminal apparatus includes: a scan job generator that generates a scan job; a file format selecting portion that allows users to select a first file format; a display portion that displays scanned data; a first judgment portion that judges whether or not the first file format is enabled; a second judgment portion that judges whether or not a second file format is enabled; a file format setting portion that sets the first or second file format; a transmitter that transmits the scan job to the image processing apparatus; a data obtaining portion that obtains the scanned data from the image processing apparatus; a display controller that allows the display portion to display the scanned data in an enabled file format; a file converter that converts the scanned data into the first file format; and a storage that stores the scanned data in the first file format.

18 Claims, 6 Drawing Sheets

(52) U.S. Cl.
CPC ...... *H04N 1/0417* (2013.01); *H04N 2201/0065* (2013.01); *H04N 2201/0075* (2013.01)

(56) References Cited

U.S. PATENT DOCUMENTS

| | | | | |
|---|---|---|---|---|
| 2002/0097262 | A1* | 7/2002 | Iwase et al. | 345/744 |
| 2003/0184803 | A1 | 10/2003 | Yamada et al. | |
| 2006/0038003 | A1 | 2/2006 | Wakasa et al. | |
| 2009/0161134 | A1* | 6/2009 | Suga | 358/1.9 |
| 2009/0310183 | A1* | 12/2009 | Sone et al. | 358/1.18 |
| 2010/0214604 | A1* | 8/2010 | Hosono et al. | 358/1.15 |
| 2012/0212763 | A1* | 8/2012 | Honma | 358/1.13 |
| 2013/0083209 | A1* | 4/2013 | Mishima et al. | 348/207.2 |
| 2013/0229694 | A1* | 9/2013 | Tonegawa | 358/426.01 |

FOREIGN PATENT DOCUMENTS

| | | |
|---|---|---|
| JP | 2004-007517 A | 1/2004 |
| JP | 2008-146507 A | 6/2008 |
| JP | 2008-312018 A | 12/2008 |
| JP | 2009-080818 A | 4/2009 |

* cited by examiner

| File Format | Display | Can be converted from | File format of an obtained file |
|---|---|---|---|
| JPEG | Enabled | – | JPEG |
| PDF (normal) | Not enabled | JPEG | JPEG |
| Compact PDF | Not enabled | – | Compact PDF |
| Encrypted PDF | Not enabled | – | Encrypted PDF |
| Searchable PDF | Not enabled | – | Searchable PDF |

PORTABLE TERMINAL APPARATUS, METHOD OF OBTAINING SCANNED DATA FROM AN IMAGE PROCESSING APPARATUS, AND RECORDING MEDIUM

This application claims priority under 35 U.S.C. §119 to Japanese Patent Application No. 2013-177414 filed on Aug. 28, 2013, the entire disclosure of which is incorporated herein by reference in its entirety.

BACKGROUND OF THE INVENTION

1. Field of the Invention

The present invention relates to: a portable terminal apparatus such as a smartphone or a tablet computer terminal; a method of obtaining scanned data from an image processing apparatus, which is to be implemented by the portable terminal apparatus; and a non-transitory computer-readable recording medium having a program stored thereon to make a computer of the portable terminal apparatus obtain scanned data from the image processing apparatus.

2. Description of the Related Art

The following description sets forth the inventor's knowledge of related art and problems therein and should not be construed as an admission of knowledge in the prior art.

In recent years, there has been a portable terminal apparatus having an application for operating an image processing apparatus, which allows the portable terminal apparatus to generate a scan job for the image processing apparatus to scan a document and return scanned data to the portable terminal apparatus.

Meanwhile, there has been an image processing apparatus that is capable of scanning documents in various file formats with its new and improved features. For example, the image processing apparatus is capable of scanning portable document format (PDF) files including: normal PDF files, compact PDF files, encrypted PDF files, and searchable PDF files, as well as JPEG files. A preferred file format can be selected among various options depending on the purpose.

When instructing the image processing apparatus to execute a scan job, the portable terminal apparatus allows users to select a file format among various options then obtains and stores scanned data in the selected file format.

In order to display scanned data in various file formats, it is necessary to install a software library for all the file formats on the portable terminal apparatus, which can cause a massive expansion of software and a shortage of resources of the portable terminal apparatus, which is an unsolved problem.

Japanese Unexamined Patent Publication No. 2008-312018 suggests a technique for allowing a portable terminal apparatus to display scanned data if its file format is not enabled on the portable terminal apparatus; that is, an image processing apparatus transmits a file including information of a plurality of image formats to a portable terminal apparatus and the portable terminal apparatus selects enabled image formats among them to display scanned data.

As described in Japanese Unexamined Patent Publication No. 2008-312018, transmitting and obtaining a file including information of a plurality of image formats can cause a heavy workload both for the image processing apparatus and the portable terminal apparatus because of its file size, respectively, which is a problem still unsolved.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to a portable terminal apparatus including:
- a scan job generator that generates a scan job for an image processing apparatus to scan a document and return scanned data to the portable terminal apparatus;
- a file format selecting portion that allows users to select a first file format for the scanned data when the scan job is generated by the scan job generator;
- a display portion that is capable of displaying the scanned data in a preview display area;
- a first judgment portion that judges whether or not the first file format selected by the file format selecting portion is enabled such that the scanned data can be displayed on the display portion;
- a second judgment portion that judges whether or not a second file format is enabled such that scanned data in the second file format can be displayed on the display portion and also can be converted into the first file format, upon the first file format being judged by the first judgment portion as being not enabled such that scanned data in the first file format cannot be displayed on the display portion;
- a file format adjustment portion that employs the first file format for the scan job upon the first file format being judged by the first file format as being enabled such that scanned data in the first file format can be displayed on the display portion, employs the second file format for the scan job, not the first file format, upon the first file format being judged by the first judgment portion as being not enabled such that scanned data in the first file format cannot be displayed on the display portion and the second file format being judged by the second judgment portion as being enabled, and employs the first file format for the scan job upon the first file format being judged by the first judgment portion as being not enabled such that scanned data in the first file format cannot be displayed on the display portion and the second file format being judged by the second judgment portion as being not enabled;
- a transmitter that transmits the scan job to the image processing apparatus, the scan job including information of the file format employed by the file format adjustment portion;
- a data obtaining portion that obtains the scanned data from the image processing apparatus as a result of execution of the scan job;
- a display controller that allows the display portion to display the scanned data in an enabled file format in the preview display area, the scanned data being obtained by the data obtaining portion;
- a file converter that converts the scanned data from the second file format to the first file format, the scanned data being obtained by the data obtaining portion; and
- a storage that stores the scanned data in the first file format, the scanned data being obtained by the data obtaining portion, or the scanned data converted from the second file format into the first file format by the file converter.

A second aspect of the present invention relates to a method of obtaining scanned data from an image processing apparatus, the method to be implemented by a portable terminal apparatus, the method including:

generating a scan job for the image processing apparatus to scan a document and return scanned data to the portable terminal apparatus;

allowing users to select a first file format for the scanned data when the scan job is generated;

judging whether or not the first file format is enabled such that scanned data in the first file format can be displayed on a display portion of the portable terminal apparatus;

judging whether or not a second file format is enabled such that scanned data in the second file format can be displayed on the display portion and also can be converted into the first file format, upon the first file format being judged as being not enabled such that scanned data in the first file format cannot be displayed on the display portion;

employing the first file format for the scan job upon the first file format being judged as being enabled such that scanned data in the first file format can be displayed on the display portion; employing the second file format for the scan job, not the first file format, upon the first file format being judged as being not enabled such that scanned data in the first file format cannot be displayed on the display portion and the second file format being judged as being enabled; employing the first file format for the scan job upon the first file format being judged as being not enabled such that scanned data in the first file format cannot be displayed on the display portion and the second file format being judged as being not enabled;

transmitting the scan job including information of the employed file format to the image processing apparatus;

obtaining the scanned data from the image processing apparatus as a result of execution of the scan job;

allowing the display portion to display the scanned data in an enabled file format in a preview display area, the scanned data being obtained from the image processing apparatus;

converting the scanned data from the second file format into the first file format, the scanned data being obtained from the image processing apparatus; and storing the scanned data in the first file format, the scanned data being obtained from the image processing apparatus, or the scanned data converted from the second file format into the first file format.

A first aspect of the present invention relates to a non-transitory computer-readable recording medium having a program stored thereon to make a computer of a portable terminal apparatus execute:

generating a scan job for an image processing apparatus to scan a document and return scanned data to the portable terminal apparatus;

allowing users to select a first file format for the scanned data when the scan job is generated;

judging whether or not the first file format is enabled such that the scanned data in the first file format can be displayed on a display portion of the portable terminal apparatus;

judging whether or not a second file format is enabled such that scanned data in the second file format can be displayed on the display portion and also can be converted into the first file format, upon the first file format being judged as being not enabled such that scanned data in the first file format cannot be displayed on the display portion;

employing the first file format for the scan job upon the first file format being judged as being enabled such that scanned data in the first file format can be displayed on the display portion; employing the second file format for the scan job, not the first file format, upon the first file format being judged as being not enabled such that scanned data in the first file format cannot be displayed on the display portion and the second file format being judged as being enabled; employing the first file format for the scan job upon the first file format being judged as being not enabled such that scanned data in the first file format cannot be displayed on the display portion and the second file format being judged as being not enabled;

transmitting the scan job including information of the employed file format to the image processing apparatus;

obtaining the scanned data from the image processing apparatus as a result of execution of the scan job;

allowing the display portion to display the scanned data in an enabled file format in a preview display area, the scanned data being obtained from the image processing apparatus;

converting the scanned data from the second file format into the first file format, the scanned data being obtained from the image processing apparatus; and storing the scanned data in the first file format, the scanned data being obtained from the image processing apparatus, or the scanned data converted from the second file format into the first file format.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described in combination with the accompanying drawings.

Figure 1:
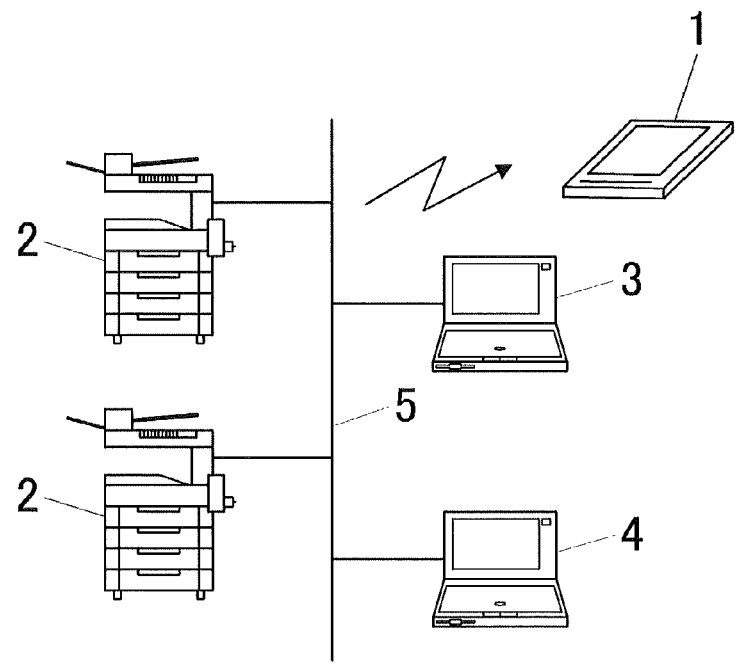
FIG. 1 illustrates a configuration of a job execution system having a portable terminal apparatus according to one embodiment of the present invention and an image processing apparatus.

FIG. 1 illustrates a configuration of a job execution system having a portable terminal apparatus according to one embodiment of the present invention and an image processing apparatus.

The job execution system is provided with: a portable terminal apparatus 1 such as a smartphone or a tablet computer terminal; one or more image processing apparatuses 2; a web server 3; a personal computer 4; and others, all of which are physically or wirelessly connected to each other through a network 5.

In this embodiment, the image processing apparatus 2 is represented by a multi-function peripheral (MFP) that is a multifunctional digital image forming apparatus having multiple functions such as copier function, printer function, facsimile function, and scanner function. Hereinafter, the image processing apparatus 2 will also be referred to as MFP 2.

Figure 2:
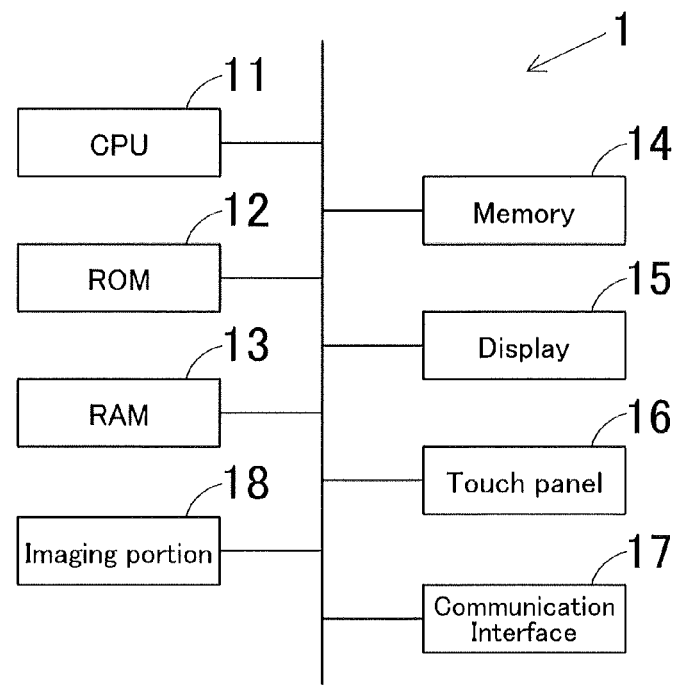
FIG. 2 is a block diagram illustrating an electrical configuration of the portable terminal apparatus.

FIG. 2 is a block diagram illustrating an electrical configuration of the portable terminal apparatus 1.

The portable terminal apparatus 1 is provided with: a CPU 11; a ROM 12; a RAM 13; a memory 14; a display 15; a touch panel 16; a communication interface (communication IF) 17; an imaging portion 18; and others.

The CPU 11 controls the entire portable terminal apparatus 1 in a unified and systematic manner in accordance with an OS, various applications for data processing, an application for operating the MFP 2, and other software installed on the portable terminal apparatus 1, which will be later described in detail.

The ROM 12 is a memory that stores operation programs for the CPU 11 and other data; the RAM 13 is a memory that provides a work area when the CPU 11 executes the operation programs.

The memory 14 is a memory that stores the OS, the applications, and other data.

The display 15, which is liquid-crystal for example, serves to display instructions and messages for users. The touch panel 16, which is provided over the display 15, detects a user's touch and identifies the coordinate at which the user touches on a screen.

The communication interface 17 supports telephone calls over a telephone circuit and wireless data communications with external apparatuses such as the MFP 2 and the web server 3 through an access point.

The imaging portion 18, which is provided with a photographic camera not shown in FIG. 2, serves to take photographs of various objects.

Hereinafter the portable terminal apparatus 1 will be described in detail.

The portable terminal apparatus 1 has an application installed thereon, which allows the portable terminal apparatus 1 to generate a scan job for the MFP 2 to scan a document and return scanned data to the portable terminal apparatus 1.

Figure 3:
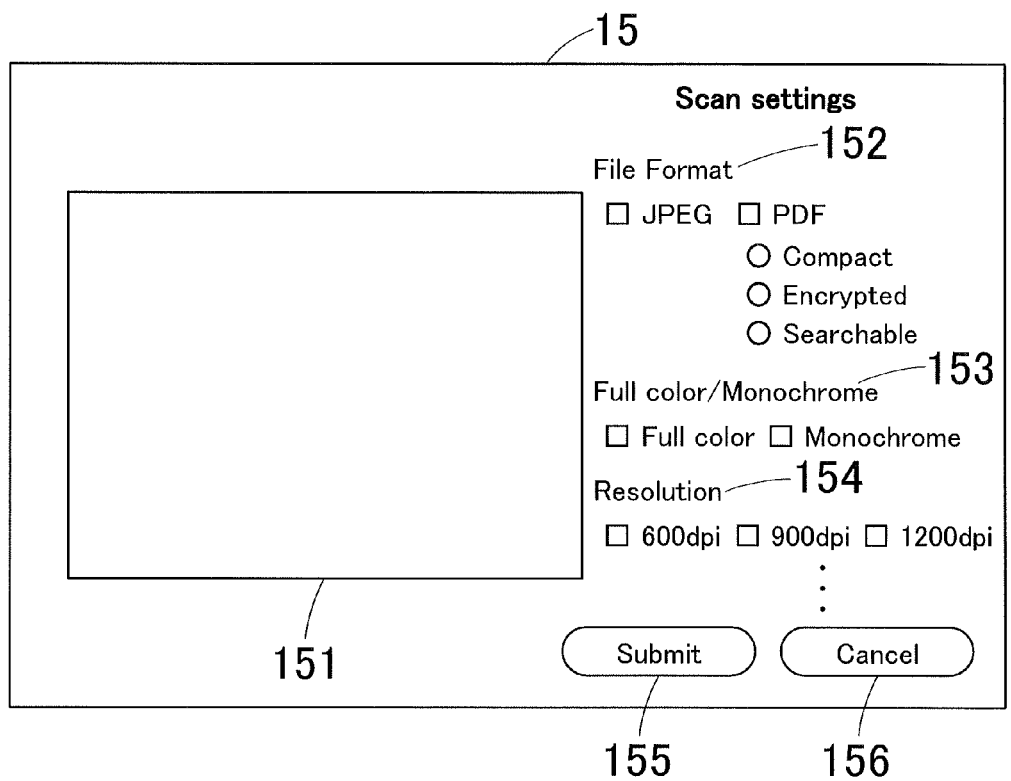
FIG. 3 illustrates a scan job settings screen.

Users can activate the application to call a scan job settings screen on the display 15 as illustrated in FIG. 3. In this embodiment, users can perform scan job settings; i.e., users can specify a file format 152 of scanned data from the MFP 2, a color mode 152, and a resolution 154. Furthermore, in this embodiment, users can select either joint photographic experts group (JPEG) or PDF as a file format. After selecting PDF, users also can select compact PDF, encrypted PDF, or searchable PDF. If users do not select any of them after selecting PDF, normal PDF is selected automatically.

There are a submit button 155 and a cancel button 156 in the scan job settings screen. The submit button 155 is pressed to transmit a generated scan job to the MFP 2; the cancel button 156 is pressed to finish scan job settings. In a left-hand part of a job settings screen, there is a preview display area 151 to display scanned data obtained from the MFP 2.

Figures 4, 5:
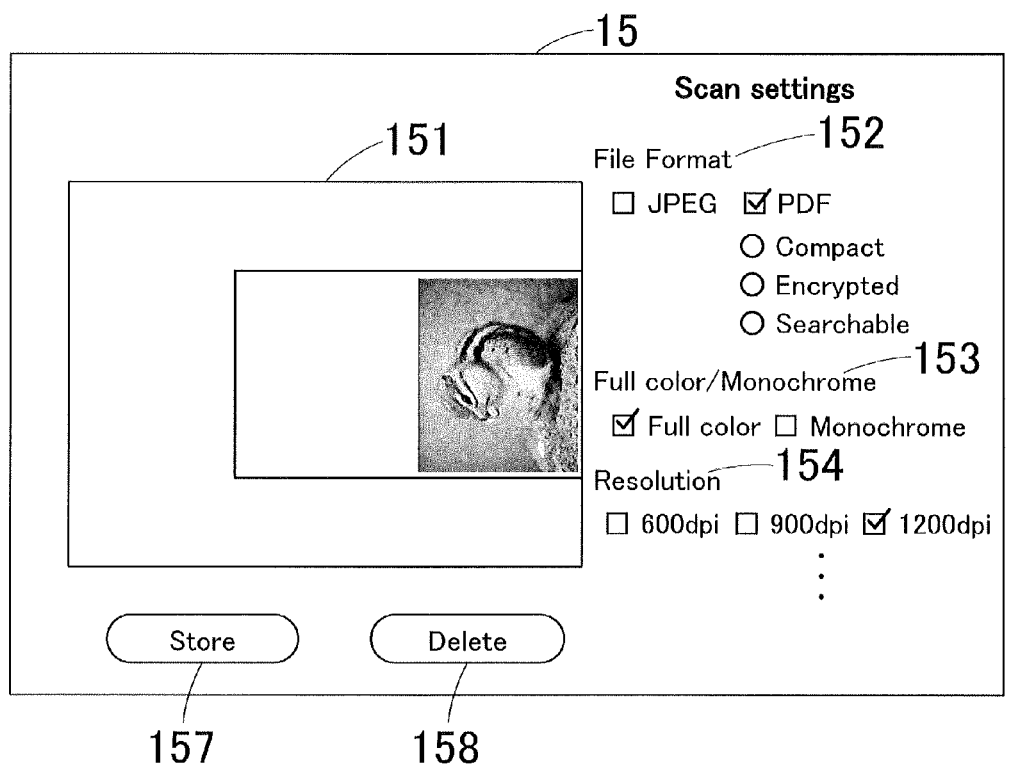
FIG. 4 illustrates a table indicating whether or not files in these file formats can be displayed on the portable terminal apparatus and files in a different file format can be converted into these file formats.
FIG. 5 is a view exemplifying a display screen of scanned data obtained from the image processing apparatus.

In this embodiment, scanned data obtained from the MFP 2 may not be able to be displayed on the display 15 because its file format is not always enabled on the portable terminal apparatus 1. Specifically, as indicated in the table of FIG. 4, the configuration is such that scanned data in JPEG file format can be displayed on the display 15 and scanned data in normal PDF, compact PDF, encrypted PDF, and searchable PDF file format cannot be displayed on the display 15.

Scanned data can be converted from JPEG into normal PDF file format and cannot be converted from a file format other than JPEG into another file format.

Thus, in this embodiment, when normal PDF is selected as the file format for a scan job, scanned data obtained from the MFP 2 is converted into JPEG file format such that it can be displayed on the display 15 and also can be converted into normal PDF file format back again, thus JPEG is set as the file format for the scan job to be executed by the MFP 2.

Specifically, when normal PDF is selected as the file format and the submit button 155 is pressed via the scan job settings screen of FIG. 3, the portable terminal apparatus 1 sets JPEG for the scan job, not normal PDF, and transmits the scan job including the settings information to the MFP 2.

Upon receiving the scan job from the portable terminal apparatus 1, the MFP 2 scans a document and generates scanned data in JPEG file format in accordance with the settings information, then returns the scanned data to the portable terminal apparatus 1.

Subsequently the portable terminal apparatus 1 receives the scanned data from the MFP 2. The scanned data can be displayed on the display 15 because its file format is JPEG, thus the portable terminal apparatus 1 displays the scanned data in the preview display area 151 of the display 15 as illustrated in FIG. 5.

A store button 157 and a delete button 158 are also displayed on a screen of FIG. 5. When the store button 157 is pressed, the portable terminal apparatus 1 converts the scanned data from JPEG to normal PDF file format that was originally selected and stores on a recording medium such as the memory 14. When the delete button 158 is pressed, the portable terminal apparatus 1 deletes the scanned data.

As described above, when normal PDF is selected as the file format, the portable terminal apparatus 1 can display scanned data on the display 15 by converting it into JPEG file format, although a conventional portable terminal apparatus could not display scanned data on its display. Consequently, the portable terminal apparatus 1 can display scanned data more often, achieving improvement in user-friendliness. Furthermore, it is not necessary any more to install an expensive library for enabling normal PDF file format such that data in normal PDF file format can be displayed; the portable terminal apparatus 1 only needs to have a function of displaying data in JPEG file format and converting it from JPEG into normal PDF file format. Consequently, the portable terminal apparatus 1 can display scanned data still more often, making full use of its limited resources. And furthermore, the portable terminal apparatus 1 converts scanned data from JPEG into normal PDF file format to store on a memory, which means that scanned data can be stored in a file format originally intended by user.

Figure 6:
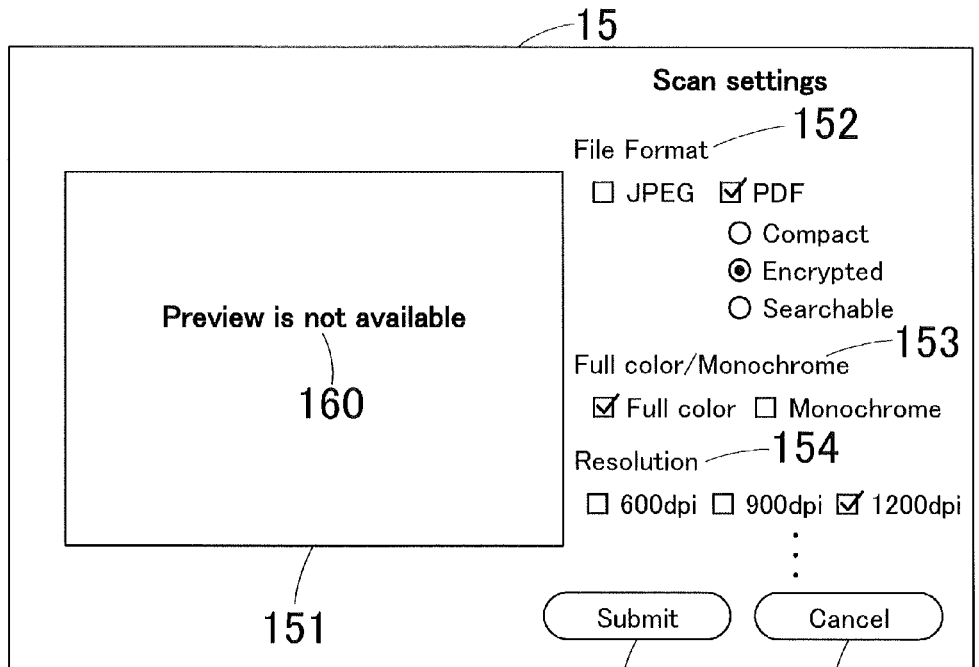
FIG. 6 is a view exemplifying a display screen to be shown if a selected file format is not enabled.
Figure 7:
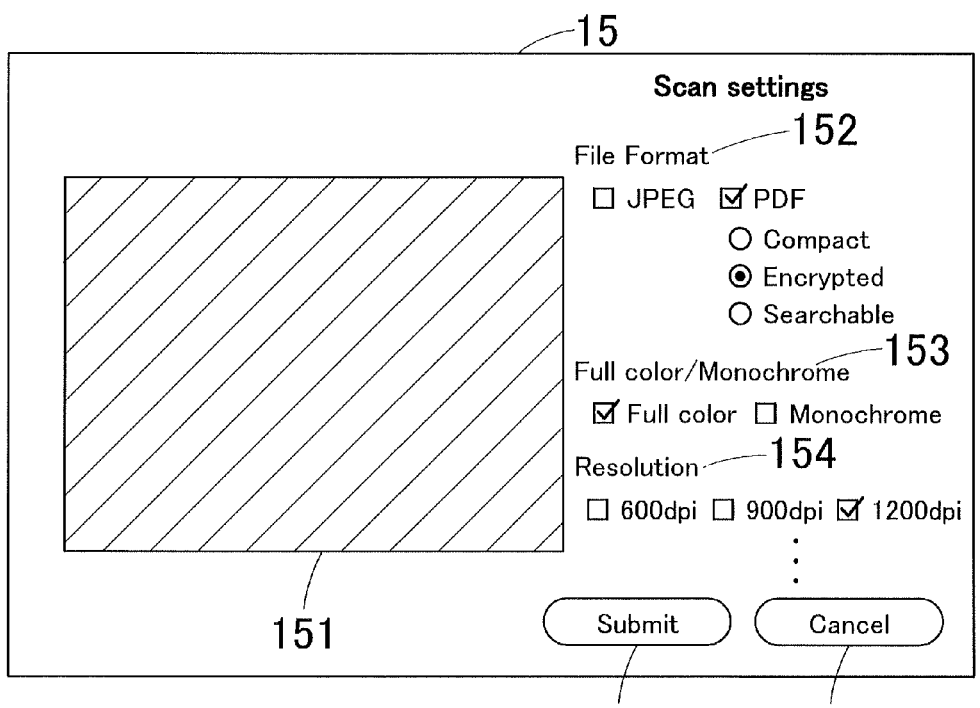
FIG. 7 is another view exemplifying a display screen to be shown if a selected file format is not enabled.

In this embodiment, if compact PDF, encrypted PDF, or searchable PDF is selected as the file format for a scan job via the scan job settings screen of FIG. 3, no scanned data in another file format than the selected file format can be displayed on the display 15 and also can be converted into the selected file format back again. In such a case, as illustrated in FIG. 6, a message 160 as "preview is not available" appears in the preview display area 151 of the display 15. Alternatively, the preview display area 151 of the display 15 may be grayed out as indicated by hatching in FIG. 7. The appearance of the message 160 as "preview is not available" or the grayed-out area allows users to recognize that scanned data cannot be displayed on the display 15 because of their selected file format.

Figure 8:
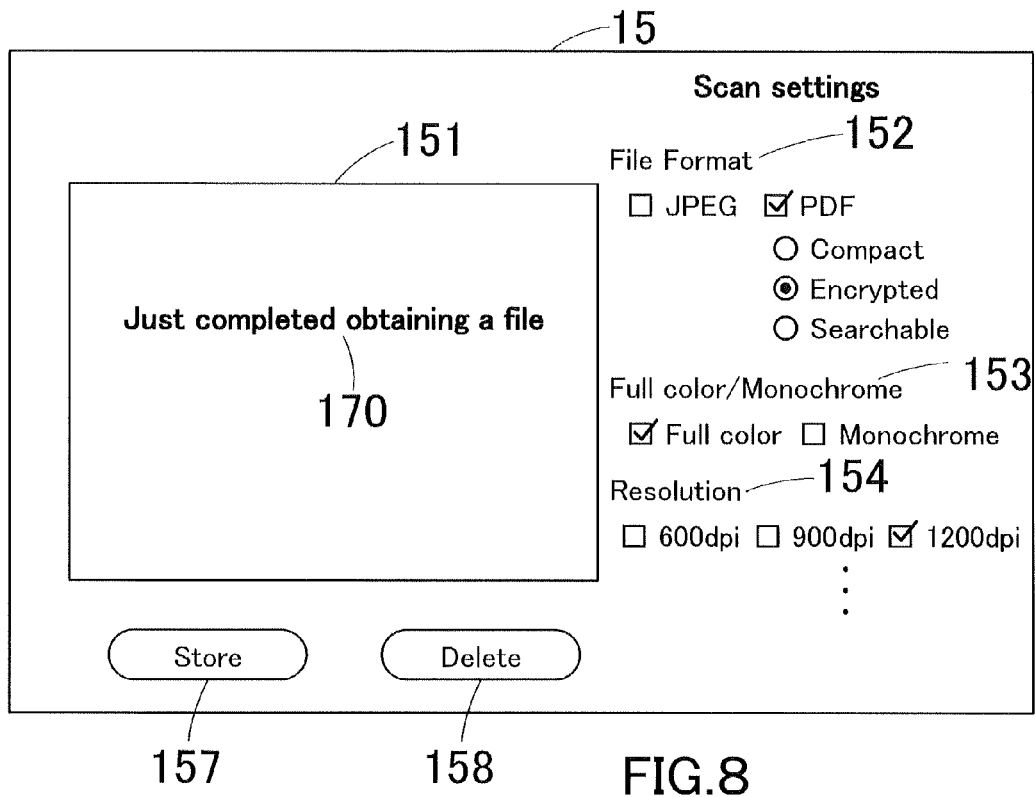
FIG. 8 is a view exemplifying a display screen to be shown if the file format of obtained scanned data is not enabled.

If compact PDF, encrypted PDF, or searchable PDF is selected as the file format, the portable terminal apparatus 1 sets the selected file format accordingly. In this case, scanned data obtained from the MFP 2 cannot be displayed on the display 15. As a solution, in this embodiment, upon scanned data being obtained, a message 170 as "just completed obtaining a file" appears in the preview display area 151 of the display 15 as illustrated in FIG. 8. Alternatively, a file icon 180 representing the scanned data may appear there as illustrated in FIG. 9.

The appearance of the message 180 or the file icon 180 allows users to recognize that the scanned data has been obtained.

Figure 9:
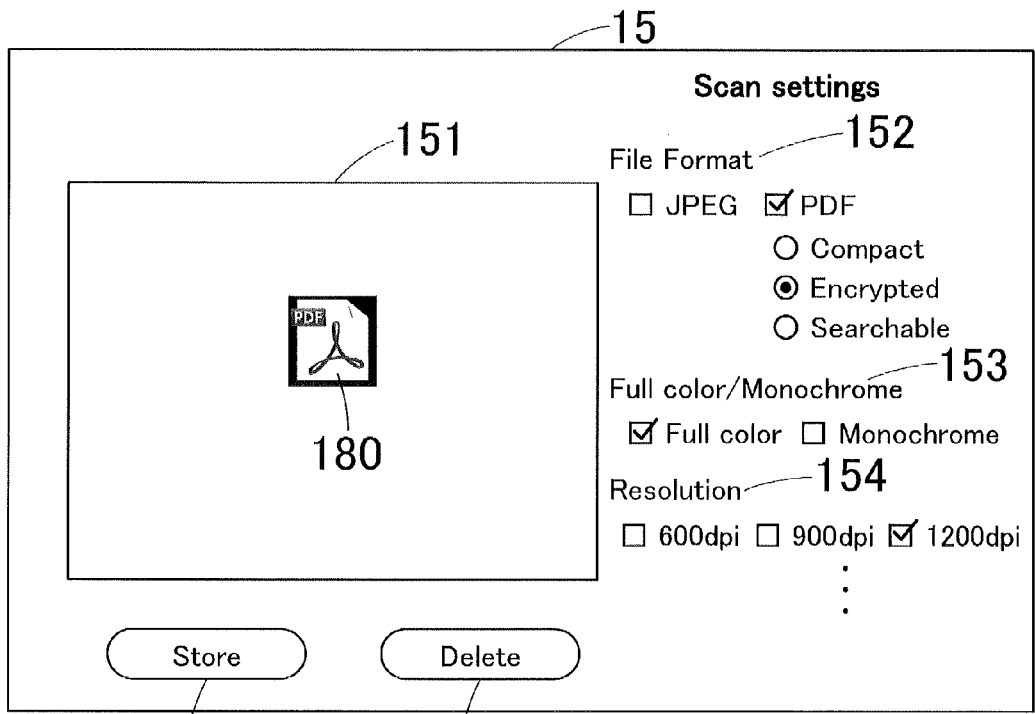
FIG. 9 is another view exemplifying a display screen to be shown if the file format of obtained scanned data is not enabled.

A store button 157 and a delete button 158 are also displayed on a screen of FIGS. 8 and 9. When the store button 157 is pressed, the portable terminal apparatus 1 stores the scanned data on a recording medium such as the memory 14 without converting it into a different file format. When the delete button 158 is pressed, the portable terminal apparatus 1 deletes the scanned data.

Figure 10:
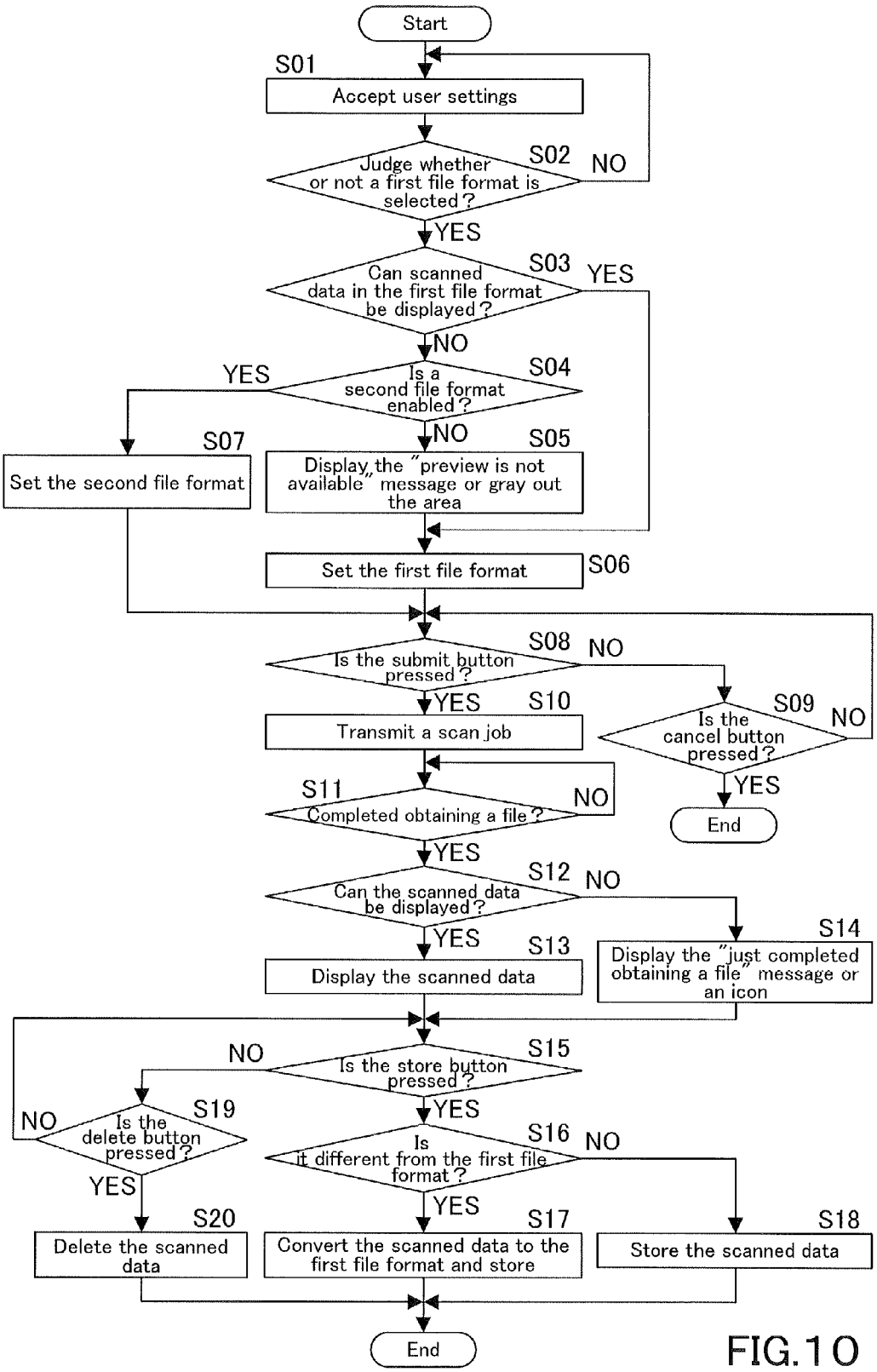
FIG. 10 is a flowchart representing an operation of the portable terminal apparatus.

FIG. 10 is a flowchart representing an operation of the portable terminal apparatus 1. This operation is performed by the CPU 11 of the portable terminal apparatus 1 in accordance with a program such as an application, stored on a recording medium such as the memory 14.

In Step S01, user scan job settings are accepted; in Step S02, it is judged whether or not a file format (a first file format) is selected. If it is not selected (No in Step S01), the routine returns to Step S01. If it is selected (YES in Step S02), then it is judged in Step S03 whether or not scanned data in the first file format can be displayed on the display 15.

If it can be displayed thereon (YES in Step S03), the first file format is set for the scan job in Step S06 and the routine proceeds to Step S08. If it cannot be displayed on the display 15 (NO in Step S03), then it is judged in Step S04 whether or not a second file format is enabled such that scanned data in the second file format can be displayed on the display 15 and also can be converted into the first file format back again.

If a second file format is enabled (YES in Step S04), the second file format, not the first file format, is set for the scan job in Step S07 and the routine proceeds to Step S08. In this case, identification of the scan job, the first file format originally selected by the user, and the second file format enabled on the portable terminal apparatus 1 are connected to each other and stored on a recording medium such as the RAM 13 of the portable terminal apparatus 1.

If a second file format is not enabled (NO in Step S04), the routine proceeds to Step S05 in which the message 160 as "preview is not available" appears in the preview display area 151 of the display 15 or the preview display area 151 is grayed out. After that, the first file format is employed for the scan job in Step S06 and the routine continues to Step S08.

In Step S08, it is judged whether or not the submit button 155 is pressed. If the submit button 155 is not pressed (NO in Step S08), then it is judged in Step S09 whether or not the cancel button 156 is pressed. If the cancel button 156 is not pressed (NO in Step S09), the routine returns to Step S08. If the cancel button 156 is pressed (YES in Step S09), the routine terminates.

In Step S08, if the submit button 155 is pressed (YES in Step S08), the scan job including the file format settings information is transmitted to the MFP 2 in Step S10.

Upon receiving the scan job, the MFP 2 scans a document and generates scanned data in the set file format, then transmits the scanned data to the portable terminal apparatus 1.

In Step S11, the routine waits until the portable terminal apparatus 1 obtains the scanned data from the MFP 2 (NO in Step S11). If the portable terminal apparatus 1 obtains the scanned data (YES in Step S11), then it is judged in Step S12 whether or not the set file format is enabled such that the scanned data can be displayed on the display 15.

If the set file format is enabled (YES in Step S12), the scanned data is displayed in the preview display area 151 of the display 15 in Step S13 and the routine proceeds to Step S15. If the employed file format is not enabled (NO in Step S12), the message 170 as "just completed obtaining a file" or the file icon 180 is displayed in the preview display area 151 of the display 15 in Step S14 and the routine proceeds to Step S15.

In Step S15, it is judged whether or not the store button 157 is pressed. If it is pressed (YES in Step S15), then it is judged in Step S16 whether or not the set file format of the scanned data is different from the first file format. If it is different from the first file format (YES in Step S16), this means that the scanned data has been converted into the second file format. Thus the scanned data is converted into the first file format back again and stored on the memory 14 in Step S17. If it is not different from the first file format (NO in Step S16), the scanned data in the first file format is stored on the memory 14 in Step S18.

In Step S15, if the store button 157 is not pressed (NO in Step S15), then it is judged in Step S19 whether or not the delete button 158 is pressed. If the delete button 158 is not pressed (NO in Step S19), the routine returns to Step S15. If the delete button 158 is pressed (YES in Step S19), the scanned data obtained from the MFP 2 is deleted in Step S20 and the routine terminates.

While one embodiment of the present invention has been described in detail herein and shown in the accompanying drawings, it should be understood that the present invention is not limited to the foregoing embodiment. In this embodiment, JPEG, normal PDF, compact PDF, encrypted PDF, and searchable PDF are used as examples of file format. In addition, other file formats, which should be such that files in these file formats can be displayed on the display 15 and also can be converted into normal PDF file format back again, just like JPEG file format, also can be used in this embodiment similarly.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A portable terminal apparatus comprising a display, a transmitter, a receiver, and a hardware processor, wherein the hardware processor is configured to:
    set a scan job for an image processing apparatus to scan a document and return scanned data to the portable terminal apparatus;
    allow a user to select a first file format for the scanned data when the scan job is set;
    allow the display to display the scanned data in a preview display area;
    judge whether or not the first file format selected is enabled such that the scanned data can be displayed on the display;
    judge whether or not a second file format is enabled such that scanned data in the second file format can be displayed on the display and also can be converted into the first file format, upon the first file format being judged as being not enabled such that scanned data in the first file format cannot be displayed on the display;
    set the first file format for the scan job upon the first file format being judged as being enabled such that scanned data in the first file format can be displayed on the display, sets the second file format for the scan job, not the first file format, upon the first file format being judged as being not enabled such that scanned data in the first file format cannot be displayed on the display and the second file format being judged as being enabled, and sets the first file format for the scan job upon the first file format being judged as being not enabled such that scanned data in the first file format cannot be displayed on the display and the second file format being judged as being not enabled;
    allow the transmitter to transmit the scan job to the image processing apparatus, the scan job including information of the set file format;
    allow the receiver to receive the scanned data from the image processing apparatus as a result of execution of the scan job;
    allow the display to display the scanned data in an enabled file format in the preview display area, the scanned data being received by the receiver;
    convert the scanned data from the second file format to the first file format, the scanned data being received by the receiver; and
    a storage that stores the scanned data in the first file format, the scanned data being received by the receiver, or the converted scanned data converted from the second file format into the first file format.

2. The portable terminal apparatus as recited in claim 1, wherein the hardware processor is further configured to allow the display to display a message in the preview display area, the message stating that the scanned data cannot be displayed, before the scan job is transmitted to the image processing apparatus, upon the first file format being set because the second file format is not enabled.

3. The portable terminal apparatus as recited in claim 1, wherein the hardware processor is further configured to allow the display to gray out the preview display area before the scan job is transmitted to the image processing apparatus upon the first file format being set because the second file format is not enabled.

4. The portable terminal apparatus as recited in claim 1, wherein the hardware processor is further configured to allow the display to display a message in the preview display area, the message stating that the scanned data has been received, in response to the scanned data in the first file format being received by the receiver, upon the first file format being set because the second file format is not enabled.

5. The portable terminal apparatus as recited in claim 1, wherein the hardware processor is further configured to allow the display to display an icon in the preview display area, the icon representing the scanned data, in response to the scanned data in the first file format being received by the received, upon the first file format being set because the second file format is not enabled.

6. The portable terminal apparatus as recited in claim 1, wherein in the case the first file format is normal PDF that is not enabled such that scanned data in normal PDF file format cannot be displayed on the display, the hardware processor sets JPEG file format as the second file format, then the receiver receives the scanned data in JPEG file format, the hardware processor is further configured to allow the display to display the scanned data in JPEG file format in the preview display area, and the hardware processor converts the scanned data from JPEG to normal PDF file format.

7. A method of obtaining scanned data from an image processing apparatus, the method to be implemented by a portable terminal apparatus, the method comprising:
    setting a scan job for the image processing apparatus to scan a document and return scanned data to the portable terminal apparatus;
    allowing users to select a first file format for the scanned data when the scan job is set;
    judging whether or not the first file format is enabled such that scanned data in the first file format can be displayed on a display portion of the portable terminal apparatus;

judging whether or not a second file format is enabled such that scanned data in the second file format can be displayed on the display portion and also can be converted into the first file format, upon the first file format being judged as being not enabled such that scanned data in the first file format cannot be displayed on the display portion;

setting the first file format for the scan job upon the first file format being judged as being enabled such that scanned data in the first file format can be displayed on the display portion;

setting the second file format for the scan job, not the first file format, upon the first file format being judged as being not enabled such that scanned data in the first file format cannot be displayed on the display portion and the second file format being judged as being enabled;

setting the first file format for the scan job upon the first file format being judged as being not enabled such that scanned data in the first file format cannot be displayed on the display portion and the second file format being judged as being not enabled;

transmitting the scan job including information of the employed file format to the image processing apparatus;

obtaining the scanned data from the image processing apparatus as a result of execution of the scan job;

allowing the display portion to display the scanned data in an enabled file format in a preview display area, the scanned data being obtained from the image processing apparatus;

converting the scanned data from the second file format into the first file format, the scanned data being obtained from the image processing apparatus; and storing the scanned data in the first file format, the scanned data being obtained from the image processing apparatus, or the scanned data converted from the second file format into the first file format.

8. The method of obtaining scanned data from the image processing apparatus as recited in claim 7, wherein the display portion is further allowed to display a message in the preview display area, the message stating that the scanned data cannot be displayed, before the scan job is transmitted to the image processing apparatus, upon the first file format being set because the second file format is not enabled.

9. The method of obtaining scanned data from the image processing apparatus as recited in claim 7, wherein the display portion is further allowed to gray out the preview display area before the scan job is transmitted to the image processing apparatus upon the first file format being set because the second file format is not enabled.

10. The method of obtaining scanned data from the image processing apparatus as recited in claim 7, wherein the display portion is further allowed to display a message in the preview display area, the message stating that the scanned data has been obtained, in response to the scanned data in the first file format being obtained from the image processing apparatus, upon the first file format being set because the second file format is not enabled.

11. The method of obtaining scanned data from the image processing apparatus as recited in claim 7, wherein the display portion is further allowed to display an icon in the preview display area, the icon representing the scanned data, in response to the scanned data in the first file format being obtained from the image processing apparatus, upon the first file format being set because the second file format is not enabled.

12. The method of obtaining scanned data from the image processing apparatus as recited in claim 7, wherein in the case the first file format is normal PDF that is not enabled such that scanned data in normal PDF file format cannot be displayed on the display portion, JPEG file format is set as the second file format, then the scanned data is obtained in JPEG file format, the display portion is allowed to display the scanned data in JPEG file format in the preview display area, and the scanned data is converted from JPEG into normal PDF file format.

13. A non-transitory computer-readable recording medium having a program stored thereon to make a computer of a portable terminal apparatus execute:

setting a scan job for an image processing apparatus to scan a document and return scanned data to the portable terminal apparatus;

allowing users to select a first file format for the scanned data when the scan job is set;

judging whether or not the first file format is enabled such that the scanned data in the first file format can be displayed on a display portion of the portable terminal apparatus;

judging whether or not a second file format is enabled such that scanned data in the second file format can be displayed on the display portion and also can be converted into the first file format, upon the first file format being judged as being not enabled such that scanned data in the first file format cannot be displayed on the display portion;

setting the first file format for the scan job upon the first file format being judged as being enabled such that scanned data in the first file format can be displayed on the display portion;

setting the second file format for the scan job, not the first file format, upon the first file format being judged as being not enabled such that scanned data in the first file format cannot be displayed on the display portion and the second file format being judged as being enabled;

setting the first file format for the scan job upon the first file format being judged as being not enabled such that scanned data in the first file format cannot be displayed on the display portion and the second file format being judged as being not enabled;

transmitting the scan job including information of the set file format to the image processing apparatus;

obtaining the scanned data from the image processing apparatus as a result of execution of the scan job;

allowing the display portion to display the scanned data in an enabled file format in a preview display area, the scanned data being obtained from the image processing apparatus;

converting the scanned data from the second file format into the first file format, the scanned data being obtained from the image processing apparatus; and storing the scanned data in the first file format, the scanned data being obtained from the image processing apparatus, or the scanned data converted from the second file format into the first file format.

14. The non-transitory computer-readable recording medium having the program stored thereon as recited in claim 13, wherein the display portion is further allowed to display a message in the preview display area, the message stating that the scanned data cannot be displayed, before the scan job is transmitted to the image processing apparatus, upon the first file format being set because the second file format is not enabled.

15. The non-transitory computer-readable recording medium having the program stored thereon as recited in claim 13, wherein the display portion is further allowed to gray out the preview display area before the scan job is transmitted to the image processing apparatus upon the first file format being set because the second file format is not enabled.

16. The non-transitory computer-readable recording medium having the program stored thereon as recited in claim 13, wherein the display portion is further allowed to display a message in the preview display area, the message stating that the scanned data has been obtained, in response to the scanned data in the first file format being obtained from the image processing apparatus, upon the first file format being set because the second file format is not enabled.

17. The non-transitory computer-readable recording medium having the program stored thereon as recited in claim 13, wherein the display portion is further allowed to display n icon in the preview display area, the icon representing the scanned data, in response to the scanned data in the first file format being obtained from the image processing apparatus, upon the first file format being set because the second file format is not enabled.

18. The non-transitory computer-readable recording medium having the program stored thereon as recited in claim 13, wherein in the case the first file format is normal PDF that is not enabled such that scanned data in normal PDF file format cannot be displayed on the display portion, JPEG file format is set as the second file format, then the scanned data is obtained in JPEG file format, the display portion is allowed to display the scanned data in JPEG file format in the preview display area, and the scanned data is converted from JPEG into normal PDF file format.

* * * * *